United States Patent Office 2,781,271
Patented Feb. 12, 1957

2,781,271

PROCESS OF CURING BACON AND COMPOSITION THEREFOR

Clarence K. Wiesman, Chicago, and William K. Perrin, Riverdale, Ill., assignors to Armour and Company, Chicago, Ill., a corporation of Illinois No Drawing. Application March 14, 1952,
Serial No. 276,704

6 Claims. (Cl. 99—159)

This invention relates to a novel bacon product and to a novel process of preparing the same. More particularly, this invention relates to the production of bacon by a process which is conducive to the development of a highly desirable color, or bloom, in the final bacon product.

The present invention is applicable to any of the pork materials commonly employed in the manufacture of bacon, such as fresh pork bellies and the like.

In the prior practice, it has been customary to prepare bacon by methods which involve curing fresh pork bellies and the like, and smoking the cured bellies to a proper finish. The curing and smoking of the meat serve to protect the meat against spoiling upon storage and provide a beneficial effect wherein the meat is reddened and its color, flavor and appearance are improved. Curing of the bacon, as generally practiced, is accomplished with a curing compound, or salt cure, containing common salt and other materials or combinations of materials such as sugar, nitrate, nitrite, etc. In the use of curing compounds, no one specific compound has obtained universal acceptance, there being considerable variation throughout the industry in the composition of the various curing compounds employed. A typical curing compound might have, for example, the following composition:

| | Percent |
|---|---|
| Salt | 50–95 |
| Sugar | 1–40 |
| Nitrate | 0–10 |
| Nitrite | 0– 1 |

According to general practice in curing the bellies, the curing compound (salt cure) is rubbed or otherwise applied on the surface of the fresh bellies, and the salted bellies are packed, in layered relation, in a curing box and held therein until the desired curing effect is complete, usually for a length of time varying from a few days to a month or more. Subsequently the cured bellies are removed from the curing box and transferred to a smoke-house where they are hung on "trees" and subjected to the action of heat and wood smoke until the flavor and appearance of the bacon are adequately developed.

In prior methods, the fresh meat often loses its fresh appearance and color while being processed, there being considerable difficulty in maintaining the natural color and fresh bloom of the bacon throughout the period involved in preparing and marketing the product. In connection with this, it is recognized that the use of sodium chloride and certain other salts is beneficial in maintaining a red appearance or bloom. In particular, the nitrate and nitrite salts, especially those of sodium and potassium, are quite effective. However, the use of nitrates and nitrites in curing meats is somewhat undesirable in that an excess of these materials is physiologically detrimental. Because of this undesirable feature, the proportion of nitrate and nitrite salts used for certain food purposes has been restricted by law. Thus, in the prior methods of bacon manufacture while the nitrate and nitrite salts are commonly employed to provide in the final bacon product a red color or bloom, such use is necessarily restricted and the full color benefit is not realized. Therefore, at the present time it would be highly desirable to have a method of preparing cured bacon which would provide the full color benefit such as is afforded by the use of excess proportions of nitrate and nitrite but which would avoid the use of curing agents in physiologically detrimental proportions.

It is an object of this invention to provide a simple, economical method of preparing a bacon product characterized by a bright red color or bloom superior to that obtained by prior methods. It is another object of this invention to treat fresh bacon materials with certain desirable food elements which serve to maintain a fresh red appearance in the lean portion of the meat body. It is still another object to provide a curing composition which is especially useful in developing and maintaining a fresh red appearance in cured bacon materials. It is a further object to provide a method of preparing cured bacon products which retain a fresh red appearance to a high degree and for prolonged periods of time. It is a still further object to provide cured bacon characterized by a bright red color or bloom superior to that obtained by prior methods. Other objects and advantages will be apparent as this specification proceeds.

We have found that if fresh bacon materials are cured with a salt curing compound containing a minor proportion of an edible iodide salt and the cured bacon materials are finished with a smoke treatment, there is a striking improvement in the appearance and color of the bacon product obtained, as compared with bacon prepared in accordance with prior methods. In particular, our bacon product has an unusually bright color which persists in many cases even after the bacon has been held for two weeks or longer. This unexpected advantage in appearance is not confined to the outer surface of the bacon slab but extends uniformly throughout the body of the meat so that when the slab is sliced or cut into portions, there is presented a fresh bright red appearance at every meat surface. The flavor of the meat is also excellent. This is surprising since it would be expected that the bacon would take on the undesirable pungent characteristic of the iodide salt employed in the curing step. There is another unexpected feature in that our method is peculiarly and specifically applicable to the preparation of bacon. Our method does not appear to have a like color benefit in the preparation of ham. The explanation for the foregoing unexpected effects is unknown to us, and we are unable to advance any theory to account for the unusual results obtained.

Our new bacon product also provides a convenient supplemental source of iodine for nutritional purposes, especially in cases where the normal diet fails to furnish the minimum amount of iodine required for proper nutrition.

A further advantage of our invention resides in the fact that the color benefit in the bacon is maximized while at the same time the use of excess amounts of physiologically detrimental curing agents is avoided.

The salt cure used in the practice of the present invention includes common salt, sugar, nitrate and/or nitrite, and a minor proportion of an edible iodide such as sodium iodide, potassium iodide, etc. Although the formulation of the salt cure with respect to salt, sugar, nitrate and nitrite may be varied considerably as indicated by the composition of a typical curing compound set forth above, the amount of edible iodide in the salt cure should be limited to a minor proportion. In general, a salt cure containing about 0.007 to 0.02% iodide will be satisfactory, the iodide content being based on the weight of the common salt employed. Preferably, the salt cure will contain about 0.01% by weight iodide (based on common salt). In any case, it is important that the salt cure contain an amount of iodide sufficient to provide the desired benefit in the appearance of the bacon product, and yet insufficient to impart an iodide flavor or character to the bacon material.

A suitable salt cure for use in our preferred practice may be provided by incorporating the iodide in the common salt and then mixing the iodized salt with the other ingredients. While we have found that a certain degree of non-uniformity in distribution of iodide in the salt cure is permissible, it is preferable to provide a uniform distribution of the iodide throughout the salt cure so that the curing effect will be uniform. Instead of adding the iodide to the salt for this purpose, it will be satisfactory to employ commercial iodized salt in which the iodide has been preliminarily distributed throughout the salt mass. Other suitable methods of providing an iodized salt cure will be apparent. We prefer to employ a salt cure containing 63 parts commercial iodized salt, 32.5 parts sugar, 4 parts sodium nitrate and 0.5 part sodium nitrite, in the formulation of which commercial iodized salt is substituted for common salt.

In our preferred method of curing, the fresh bacon materials are rubbed with the iodized salt cure at the rate of a few pounds of salt cure for each one hundred pounds of meat. The rubbed materials are then placed in a dry-curing box and held for about three weeks, following which the cured materials are subjected to smoking in accordance with conventional smoking practices. Prior to curing, when the rubber materials are first placed in the dry-curing box, an iodized pickle having the above salt cure ingredients may be optionally sprinkled over the rubbed materials to insure further contact of the materials.

Instead of using a dry cure, it will likewise be satisfactory to employ the iodized salt cure in the form of a pickle and to inject the pickle under pressure into, and throughout the body of, the bacon material. We prefer to employ a 60° salometer base pickle (prepared with commercial iodized salt in place of common salt) to each 100 gallons of which are added 30 pounds of sugar and ¾ of a pound of sodium nitrite, the finished salometer value of the pickle being 68°. In most cases, it will be satisfactory to inject about 10 pounds of iodized pickle for every 100 pounds of uncured bacon material. For this purpose, any suitable pickle injector may be employed which will provide substantially uniform distribution of pickle throughout the body of the injected meat. Following injection and pumping with iodized pickle, the bacon material is cured preferably for about 72 hours and then smoked in accordance with conventional smoking practices.

In smoking the bacon materials it will be satisfactory to provide conventional smoke and heat conditions, i. e. conditions normally encountered in smoke-house operations, care being taken to avoid underheating. Temperatures of the order of 135° to 140° F. are preferred.

The following specific examples of preferred methods of preparing bacon will serve to illustrate our invention.

*Example I*

A salt cure containing salt, sugar, nitrate, nitrite and potassium iodide is prepared by mixing 60 parts commercial iodized salt (potassium iodide content about 0.01% by weight) with 35 parts sugar, 4 parts nitrate, and about 1 part nitrite. The salt cure is applied to a quantity of pork bellies at the rate of 3.97 pounds salt cure per one hundred pounds of meat. The bellies are thoroughly rubbed and then placed in a dry-curing box, cured for 21 days, and smoked in a smoke-house according to conventional practice. Representative slabs are sliced for flavor and color evaluation. The flavor is excellent and the color is considerably brighter than that of bacon produced by conventional methods. The un- usually bright color persists after the bacon is held two weeks. Analysis of the sliced bacon shows iodine values (as potassium iodide) ranging from 3 to 11 p. p. m.

*Example II*

A salt cure is prepared by mixing 0.01% by weight potassium iodide in common salt, and 63 parts by weight of the resulting mixture are combined and mixed with 32.5 parts sugar, 4 parts sodium nitrate and 0.5 part sodium nitrite. The salt cure is then rubbed into a quantity of pork slicing bellies at the rate of about 3.25 pounds per one hundred pounds of meat, and the salted bellies are placed in dry cure for three weeks and subsequently smoked for 18 to 20 hours at a temperature of the order of 135° to 145° F.

After smoking, the bellies have an excellent bright red surface color or bloom which is superior to that of conventionally cured bacon smoked on alternate trees in the same smoke-house. The flavor of the iodide-cured bellies is excellent.

*Example III*

A 60° salometer base pickle employing commercial iodized salt (0.01% iodide by weight) in place of common salt and to each 100 gallons of which are added 30 to 50 pounds of sugar and ¾ of a pound of sodium nitrite, is used in injecting bacon bellies. The bellies are pumped to a 10 percent weight takeup with an injecting machine having a battery of needles adapted to cover, at spaced intervals, the entire surface of an individual belly.

The pumped bellies are piled six high on racks and cured for 72 hours. Subsequently, the cured bellies are smoked to a finish in accordance with conventional smoking procedure. The finished bacon product is characterized by superior appearance and color.

While in the foregoing specification we have set forth certain embodiments and modes of operation in considerable detail for the sake of illustrating our invention, it will be understood that such detail may be varied widely by those skilled in the art without departing from the spirit of our invention.

We claim:

1. The process of preparing a bacon product having improved color characteristics, comprising curing a fresh bacon material with a salt-cure composition containing a minor proportion, between about 0.007 and 0.02 weight percent based on the common salt present, of an edible iodide salt, and smoking said cured bacon material to develop a bright color in said material.

2. In the process of preparing a bacon product having improved color characteristics comprising salt-curing and smoking, the step of subjecting a fresh bacon body to curing treatment with a salt-curing mixture containing about 0.01% by weight based on the common salt present of an edible iodide salt.

3. The process of preparing a bacon product having improved color characteristics, comprising curing a fresh bacon material with a dry-cure mixture containing about 0.01% by weight based on the common salt present of potassium iodide, and smoking the cured bacon material at a smoking temperature to develop a bright red color in said material.

4. The process of preparing a bacon product having improved color characteristics, comprising pumping a fresh bacon material with pickle containing about 0.01% by weight based on the common salt present of an edible iodide salt, curing said bacon material, and smoking the cured bacon material at a smoking temperature to develop a bright red color in said material.

5. A dry salt cure composition for curing bacon containing a minor proportion, between about 0.007 and 0.02 weight percent based on the common salt present, of an edible iodide salt.

6. A bacon-curing composition including salt, sugar, nitrite and a minor proportion, between about 0.007 and 0.02 weight percent based on the common salt present, of an edible iodide salt.

References Cited in the file of this patent

UNITED STATES PATENTS

| | | |
|---|---|---|
| 128,372 | Dotch | June 25, 1872 |
| 906,473 | Turner | Dec. 8, 1908 |
| 2,176,144 | Moskowitz et al. | Oct. 17, 1939 |
| 2,205,872 | Berry | June 25, 1940 |
| 2,417,804 | Adler | Mar. 25, 1947 |
| 2,442,663 | Rinehart | June 1, 1948 |
| 2,452,641 | Engels | Nov. 2, 1948 |
| 2,528,204 | Zwosta | Oct. 31, 1950 |

FOREIGN PATENTS

| | | |
|---|---|---|
| 22,989 | Great Britain | 1895 |